US007614558B2

(12) United States Patent
Katsurabayashi

(10) Patent No.: US 7,614,558 B2
(45) Date of Patent: Nov. 10, 2009

(54) DOCUMENT CORRECTION DETECTION SYSTEM AND DOCUMENT TAMPERING PREVENTION SYSTEM

(75) Inventor: Hiroshi Katsurabayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/401,331

(22) Filed: Apr. 11, 2006

(65) Prior Publication Data

US 2007/0017990 A1 Jan. 25, 2007

(30) Foreign Application Priority Data

Jul. 19, 2005 (JP) .......................... P2005-208977

(51) Int. Cl.
*G06K 7/00* (2006.01)
*H04L 9/32* (2006.01)

(52) U.S. Cl. ...................................... 235/454; 713/176

(58) Field of Classification Search ................ 235/454, 235/375, 432, 470, 468, 491; 713/176, 179
See application file for complete search history.

(56) References Cited

U.S. PATENT DOCUMENTS

| | | | | | |
|---|---|---|---|---|---|
| 5,291,243 | A | * | 3/1994 | Heckman et al. | 399/3 |
| 5,522,623 | A | * | 6/1996 | Soules et al. | 283/91 |
| 5,605,738 | A | * | 2/1997 | McGinness et al. | 428/195.1 |
| 5,611,575 | A | * | 3/1997 | Petrie | 283/67 |
| 5,995,638 | A | * | 11/1999 | Amidror et al. | 382/100 |
| 6,175,714 | B1 | * | 1/2001 | Crean | 399/366 |
| 6,373,965 | B1 | * | 4/2002 | Liang | 382/112 |
| 6,427,020 | B1 | * | 7/2002 | Rhoads | 382/100 |
| 6,611,612 | B2 | * | 8/2003 | Mann | 382/112 |
| 6,970,259 | B1 | * | 11/2005 | Lunt et al. | 358/1.14 |
| 2002/0012445 | A1 | * | 1/2002 | Perry | 382/100 |
| 2002/0097903 | A1 | * | 7/2002 | Prakash | 382/137 |
| 2003/0099379 | A1 | * | 5/2003 | Monk et al. | 382/115 |
| 2004/0081332 | A1 | * | 4/2004 | Tuttle et al. | 382/100 |
| 2004/0117627 | A1 | * | 6/2004 | Brewington | 713/176 |
| 2005/0038756 | A1 | * | 2/2005 | Nagel | 705/76 |
| 2005/0152006 | A1 | * | 7/2005 | Abe et al. | 358/3.28 |
| 2006/0109515 | A1 | * | 5/2006 | Zhao et al. | 358/3.28 |
| 2006/0221383 | A1 | * | 10/2006 | Katsurabayashi | 358/1.15 |

FOREIGN PATENT DOCUMENTS

| | | | | |
|---|---|---|---|---|
| EP | 1209897 | A2 | * | 5/2002 |
| JP | A-62-286165 | | | 12/1987 |
| JP | T-2004-528644 | | | 9/2004 |

OTHER PUBLICATIONS

Derwent Information LTD, Derwent week 200251, Abstract for publication No. NL 1015611 C2, Inventor Tuinstra, S G.*

* cited by examiner

*Primary Examiner*—Daniel A Hess
(74) *Attorney, Agent, or Firm*—Morgan, Lewis & Bockius LLP

(57) ABSTRACT

A document correction detection system includes a code analysis section that inputs a read image provided by optically reading a print medium on which a document image and a code image are formed and extracts the code image from the read image and a correction detection section that determines a correction made to the document image on the print medium if an anomaly in the code image extracted by the code analysis section is detected.

23 Claims, 9 Drawing Sheets

FIG. 4
RECEIPT
Date:
¥114,000
Received as payment of termite extermination work
XXXX BUILDER

DOCUMENT CORRECTION DETECTION SYSTEM AND DOCUMENT TAMPERING PREVENTION SYSTEM

This application claims the benefit of Japanese Patent Application No. 2005-208977 filed on Jul. 19, 2005, which is hereby incorporated by reference.

BACKGROUND

1. Technical Field

This invention relates to a document management system and in particular to document tampering prevention when the image data of a document created with paper is managed.

2. Related Art

Nowadays, various documents widely are created as electronic data and are managed and processed. In this case, the document may be created as an electronic document; often a document created with paper may be read using a scanner to acquire image data for management and processing. To manage the document created with paper as image data, it is important to manage the relationship between the paper document and the data and prevent document tampering to prevent unauthorized use of the document.

In recent years, attention has been focused on an art of using special paper with fine dots printed thereon (containing various sheet-like media) and inputting characters, an image, etc., handwritten on the paper by the user as electronic information. The input data is transferred to a personal computer, a mobile telephone, etc., and can be stored in a magnetic disk unit or any other storage or can be transmitted as electronic mail. In this art, small dots are printed on the special paper with a spacing of about 0.3 mm, for example, and the dots contained in a grid of a predetermined size draw a different pattern for each grid. The dot pattern can represent position information of an address, etc. Then, the dot pattern is read with a dedicated pen incorporating optical read section such as a digital camera, for example, whereby it is made possible to determine the position of the pen point and a move trace on the special paper. As information of the position of the pen point and the move trace is processed, it is made possible to use the handwritten characters and image on the paper as electronic information.

SUMMARY

According to an aspect of the present invention, a document correction detection system includes a code analysis section that inputs a read image provided by optically reading a print medium on which a document image and a code image are formed and extracts the code image from the read image, and a correction detection section that determines a correction made to the document image on the print medium if an anomaly in the code image extracted by the code analysis section is detected.

BRIEF DESCRIPTION OF THE DRAWINGS

Exemplary embodiment(s) of the present invention will be described in detail based on the following figures wherein.

DETAILED DESCRIPTION

The exemplary embodiment of the present invention will be discussed below in detail with reference to the accompanying drawings.

The invention is intended for implementing a system that can detect tampering even if a document is tampered with at a stage before the document is electronized. Assumed as specific implementation techniques are a technique capable of detecting a correction made to a document using white-out, etc., and a technique for detecting whether or not a document created with a voucher, etc., put thereon is previously tampered when the image of the document is first read. The two techniques will be discussed below with exemplary embodiments:

FIRST EXEMPLARY EMBODIMENT

In a first exemplary embodiment of the invention, a system that can detect tampering if a correction is made to a document using white-out, etc., (also containing such a correction of putting another sheet of paper, etc., so as to cover the description of the document) will be discussed as the technique of detecting tampering at a stage before a document is electronized. To detect tampering with a document, the exemplary embodiment uses a technique of forming a code image of a dot pattern on a print medium (paper) on which the document is to be created and describing predetermined formation according to the dot pattern.

Figure 1:
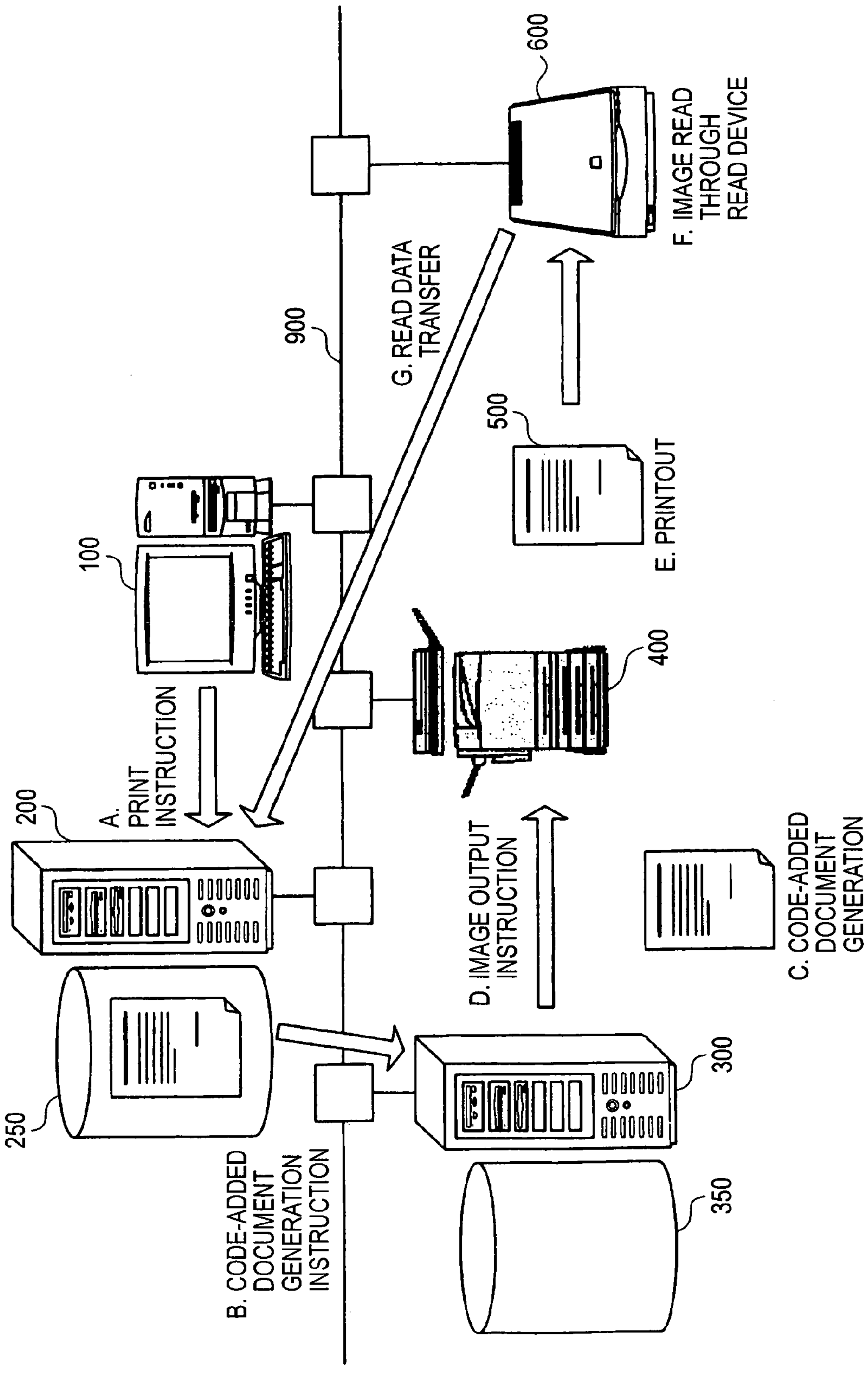
FIG. 1 is a drawing to show a configuration example of a system incorporating a first exemplary embodiment of the invention.

FIG. 1 shows a configuration example of a system incorporating a first exemplary embodiment of the invention. This system is made up of at least a terminal 100 for giving a print instruction of an electronic document, a document management server 200 for managing the electronic document to be printed, an identification information management server 300 for generating a code-added document with a code image indicating identification information, etc., added to the document image of the electronic document whose print instruction is given, and an image formation apparatus 400 for printing the code-added document, the components 100, 200, 300, and 400 being connected to a network 900.

A document repository 250 as storage for storing electronic documents is connected to the document management server 200. An identification information repository 350 as storage for storing identification information is connected to the identification information management server 300. In the exemplary embodiment, the identification information may be used to identify the medium or may be used to identify the electronic document.

Further, the system includes code-image-added paper 500 output on the image formation apparatus 400 and a read device 600 for recording text or a graphic form on the code-image-added paper 500 and reading record information of the text or the graphic form.

Next, an outline of the operation of the system will be discussed:

First, the terminal 100 instructs the document management server 200 to print a specific electronic document managed in the document repository 250 (A). At this time, from the terminal 100, the print attributes of the paper size, the orientation, etc., and additional information used for a user application program (user AP) to perform processing based on printed matter are also input.

Accordingly, the document management server 200 transmits the electronic document whose print instruction is given, the print attributes, the additional information, etc., to the identification information management server 300 and instructs the identification information management server 300 to give a code image indicating the identification information, etc., to the document image of the electronic document to generate a code-added document (B). Upon reception of the instruction, the identification information management server 300 gives a code image indicating the identification information, etc., managed in the identification information repository 350 to the document image of the electronic document whose print instruction is given to generate a code-added document (C).

The information given as the code image contains position information for determining the coordinate position on paper (X coordinate, Y coordinate) as well as the identification information. The additional information input in the terminal 100 can also be contained in the code image.

Next, the identification information management server 300 instructs the image formation apparatus 400 to output the image of the code-added document (D). Accordingly, the image formation apparatus 400 outputs the code-image-added paper 500 (E).

The image formation apparatus 400 forms the code image given by the identification information management server 300 as an invisible image in invisible toner and forms any other image (image in the portion contained in the original electronic document) as a visible image in visible toner as described later in detail.

Then, the image of the document created using the code-image-added paper 500 is read using the read device 600 (F). The read image data (read image) is transferred to and registered in the document management server 200 as the electronic data (electronic document) of the document (G). The system makes it possible to form an invisible image using invisible toner with the absorption ratio of infrared light higher than a predetermined standard and read the invisible image through the read device 600 capable of applying and detecting infrared light.

However, such a configuration is only an example. The document management server 200 may be provided with the function of the identification information management server 300 or the function of the identification information management server 300 may be implemented as the function of an image processing section of the image formation apparatus 400. In the exemplary embodiment, the case where an electronic document is to be printed (print object) will be discussed. The electronic document includes not only simple text data, but also image data of a photo image, etc., for example.

Next, the image formation apparatus 400 shown in FIG. 1 will be discussed in detail.

Figure 2:
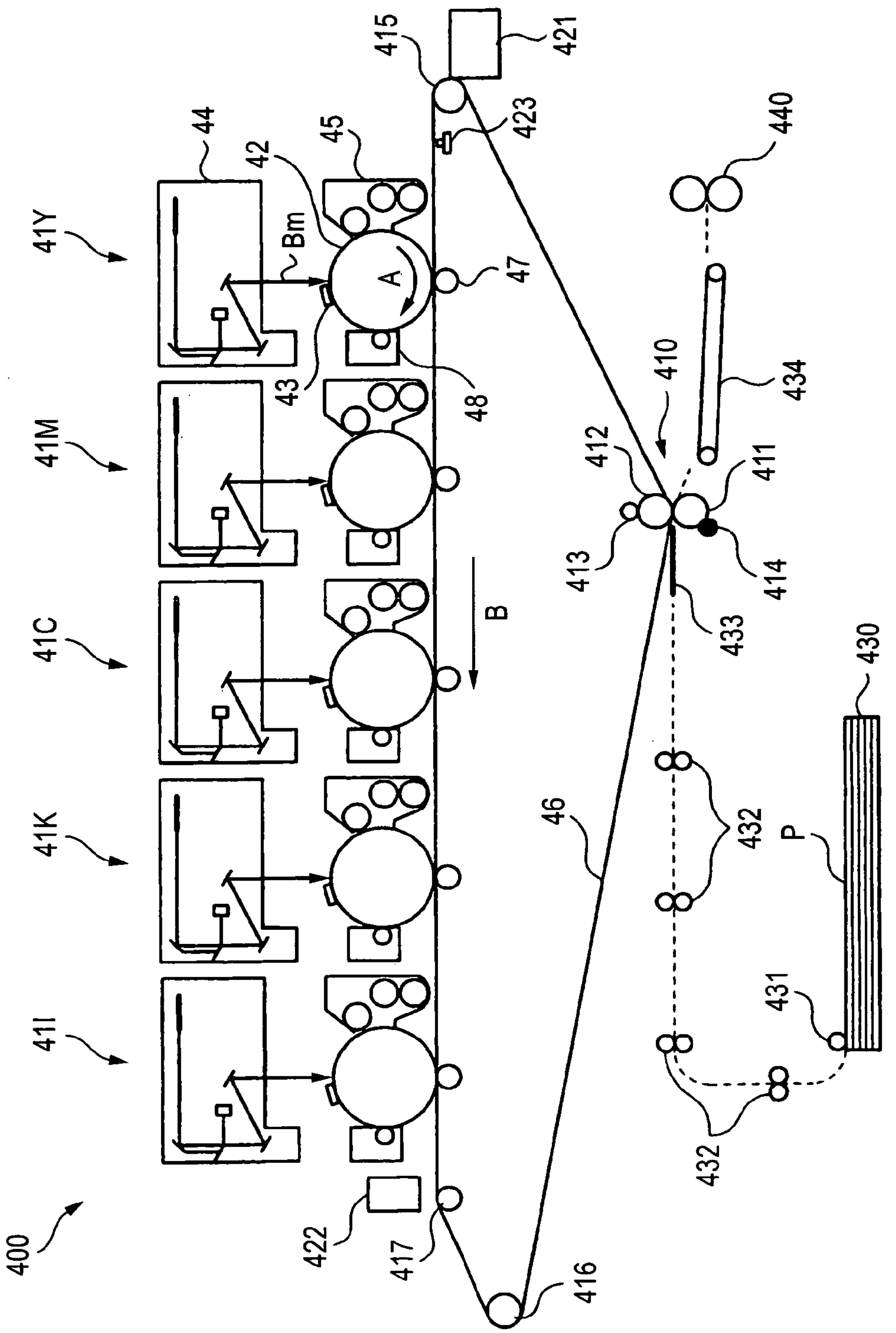
FIG. 2 is a drawing to show a configuration example of an image formation apparatus in FIG. 1.

FIG. 2 is a drawing to show a configuration example of an image formation apparatus 400 of the exemplary embodiment. The image formation apparatus 400 shown in FIG. 2 is a tandem apparatus; for example, it includes a plurality of image formation units 41 (41Y, 41M, 41C, 41K, and 41I) for forming toner images of color components electrophotographically, an intermediate transfer belt 46 for transferring the color component toner images formed in the image formation units 41 in sequence (primary transfer) and retaining the color component toner images, a secondary transfer unit 410 for transferring the overlap image transferred onto the intermediate transfer belt 46 onto paper (medium) P in batch (secondary transfer), and a fuser 440 for fixing the secondarily transferred image onto the paper P.

The image formation apparatus 400 is provided with the image formation unit 41K for forming a toner image of black (K) having no infrared absorption and the image formation unit 41I for forming an invisible toner image as the image formation units forming the tandem as well as the image formation units 41Y, 41M, and 41C for forming toner images of yellow (Y), magenta (M), and cyan (C) of commonly used colors (usual colors). The toner composition is described later in detail.

In the exemplary embodiment, in each of the image formation units 41 (41Y, 41M, 41C, 41K, and 41I), disposed in sequence surrounding a photoconductor drum 42 for rotating in the arrow A direction are electrophotographic devices such as a charger 43 for charging the photoconductor drum 42, a laser exposure device 44 for writing an electrostatic latent image onto the photoconductor drum 42 (in the figure, exposure beam is indicated by Bm), a developing device 45 in which the corresponding color component toner is stored for rendering the electrostatic latent image on the photoconductor drum 42 as a visible image in toner, a primary transfer roll 47 for transferring the color component toner images formed on the photoconductor drum 42 onto the intermediate transfer belt 46, and a drum cleaner 48 for removing the remaining toner on the photoconductor drum 42. The image formation units 41 are placed in the order of yellow (Y), magenta (M), cyan (C), black (K), and invisible (I) color upstream of the intermediate transfer belt 16.

The intermediate transfer belt 46 can be rotated in the arrow B direction shown in the figure by various rolls of a drive roll 415 for rotating the intermediate transfer belt 46 driven by a motor (not shown), a tension roller 416 having functions of giving constant tension to the intermediate transfer belt 46 and preventing the intermediate transfer belt 46 from meandering, an idle roll 417 for supporting the intermediate transfer belt 46, and a backup roller 412 (described later).

A voltage of the opposite polarity to the toner charge polarity is applied to the primary transfer roll 47, whereby the toner images on the photoconductor drum 42 are electrostatically attracted to the intermediate transfer belt 46 in order and an overlap toner image is formed on the intermediate transfer belt 46. Further, the secondary transfer unit 410 includes a secondary transfer roll 411 pressed against and placed on the toner image support side of the intermediate transfer belt 46 and a backup roller 412 placed on the back of the intermediate transfer belt 46 for forming a counter electrode of the secondary transfer roll 411. A metal feeding roll 413 to which a secondary transfer bias is stably supplied is abutted against and placed on the backup roller 412. A brush roll 414 for removing dirt deposited on the secondary transfer roll 411 is brought into contact with the secondary transfer roll 411.

A belt cleaner 421 for cleaning the surface of the intermediate transfer belt 46 after secondary transfer is provided downstream from the secondary transfer roll 411. On the other hand, an image density sensor 422 for adjusting the image quality is disposed upstream from the secondary transfer roll 411. Further, a reference sensor (home position sensor) 423 for generating a reference signal used as the reference to provide timing in the image formation units 41 is placed upstream from the Y image formation unit 41Y. The reference sensor 423 recognizes a predetermined mark put on the back of the intermediate transfer belt 46 and generates a reference signal, and the image formation units 41 start image formation according to an instruction from a control section (not shown) based on recognition of the reference signal.

Further, the image formation apparatus 400 shown in the figure includes as a paper transport system, a paper tray 430 for storing paper P, a pickup roller 431 for picking up and transporting paper P stacked on the paper tray 430 at a predetermined timing, a transport roll 432 for transporting the paper P paid out by the pickup roller 431, a transport chute 433 for feeding the paper P transported by the transport roll 432 into a secondary transfer position of the secondary transfer unit 410, and a transport belt 434 for transporting the paper P after secondary transfer to the fuser 410.

Next, the image formation process of the image formation apparatus 400 will be discussed.

When the user turns on a start switch (not shown), a predetermined image formation process is executed. Specifically, for example, to implement the image formation apparatus 400 as a color printer, a digital image signal transmitted from the network 900 (see FIG. 1) is temporarily stored in memory and color toner images are formed based on the stored five-color (Y, M, C, K, and I) digital image signal.

That is, the image formation units 41 (41Y, 41M, 41C, 41K, and 41I) are driven based on color image record signals provided by performing image processing. Each of the image formation units 41Y, 41M, 41C, 41K, and 41I writes an electrostatic latent image responsive to the corresponding image record signal by the laser exposure device 44 onto the photoconductor drum 42 uniformly charged by the charger 43. The image formation unit develops the written electrostatic latent image by the developing device 45 in which the corresponding color toner is stored to form the toner image of the corresponding color.

The toner image formed on each photoconductor drum 42 is primarily transferred from the photoconductor drum 42 onto the surface of the intermediate transfer belt 46 according to a primary transfer bias applied by the primary transfer roll 47 at the primary transfer position where the photoconductor drum 42 and the intermediate transfer belt 46 are in contact with each other. The toner images thus primarily transferred onto the intermediate transfer belt 46 are overlapped on each other on the intermediate transfer belt 46 and are transported to the secondary transfer position with rotation of the intermediate transfer belt 46.

On the other hand, the paper P is transported to the secondary transfer position of the secondary transfer unit 410 at a predetermined timing and is nipped by the secondary transfer roll 411 and the intermediate transfer belt 46 (backup roll 412). The overlap toner image supported on the intermediate transfer belt 46 is secondarily transferred onto the paper P by the action of a secondary transfer electric field formed between the secondary transfer roll 411 and the backup roll 412.

Then, the paper P onto which the toner image is transferred is transported over the transport belt 434 to the fuser 440 for fixing the toner image. On the other hand, the intermediate transfer belt 46 after the secondary transfer has the remaining toner removed by the belt cleaner 421.

Here, the toner used with the image formation apparatus 400 will be discussed in detail.

First, formerly used toners are used as Y toner used in the image formation unit 41Y, M toner used in the image formation unit 41M, and C toner used in the image formation unit 41C.

In contrast, in the exemplary embodiment, special toner is provided as K toner used in the image formation unit 41K. Since formerly used K toner (using carbon black as coloring material of black) absorbs infrared light, it is not appropriate to use the formerly used K toner to form a usual image in which no information is embedded in the system for reading information embedded using invisible toner by infrared light application. That is, in the exemplary embodiment, toner having an extremely low absorption ratio of infrared light and capable of printing black is adopted as K toner. As such toner, toner provided by mixing Y toner, M toner, and C toner is illustrated (usually, the color materials of yellow, magenta, and cyan less absorb the wavelength in the infrared region).

Although toner different in nature from the formerly used K toner is used, such special toner is also described as "K toner" for convenience in the Specification.

As invisible toner used in the image formation unit 41I, for example, it is possible to use toner containing the material described in JP-A-2003-186238, namely, containing binding resin and near infrared absorption material made of inorganic material particles.

As the binding resin, specifically polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, etc., can be named.

Inorganic material particles containing at least CuO and $P_2O_5$ can be used as the near infrared absorption material. Preferably, the density content of CuO in invisible toner particles is in the range of 6% by mass to 35% by mass; more preferably in the range of 10% by mass to 30% by mass. Further, to provide uniform dispersibility of the inorganic material particles in the invisible toner and proper negative frictional electrification property required as record material for electrophotograph, preferably the inorganic material particles are made of copper phosphoric acid crystallized glass consisting essentially of CuO, $Al_2O_3$, $P_2O_5$, and $K_2O$. In the composition of the copper phosphoric acid crystallized glass, preferably CuO is in the range of 20% by mass to 60% by mass, $Al_2O_3$ is in the range of 1% by mass to 10% by mass, $P_2O_5$ is in the range of 30% by mass to 70% by mass, and $K_2O$ is in the range of 1% by mass to 10% by mass.

The image formation apparatus 400 forms a code image using an invisible color material having a characteristic wherein the wavelength in a specific infrared region is absorbed more than the wavelength in a visible light region as described above. On the other hand, the image formation apparatus 400 forms an image such as a document image using a visible color material having a characteristic much absorbing the wavelength in the visible light region.

Next, the two-dimensional code image (code pattern) printed on the image formation apparatus 400 of the exemplary embodiment will be discussed taking specific pattern examples.

Figure 3:
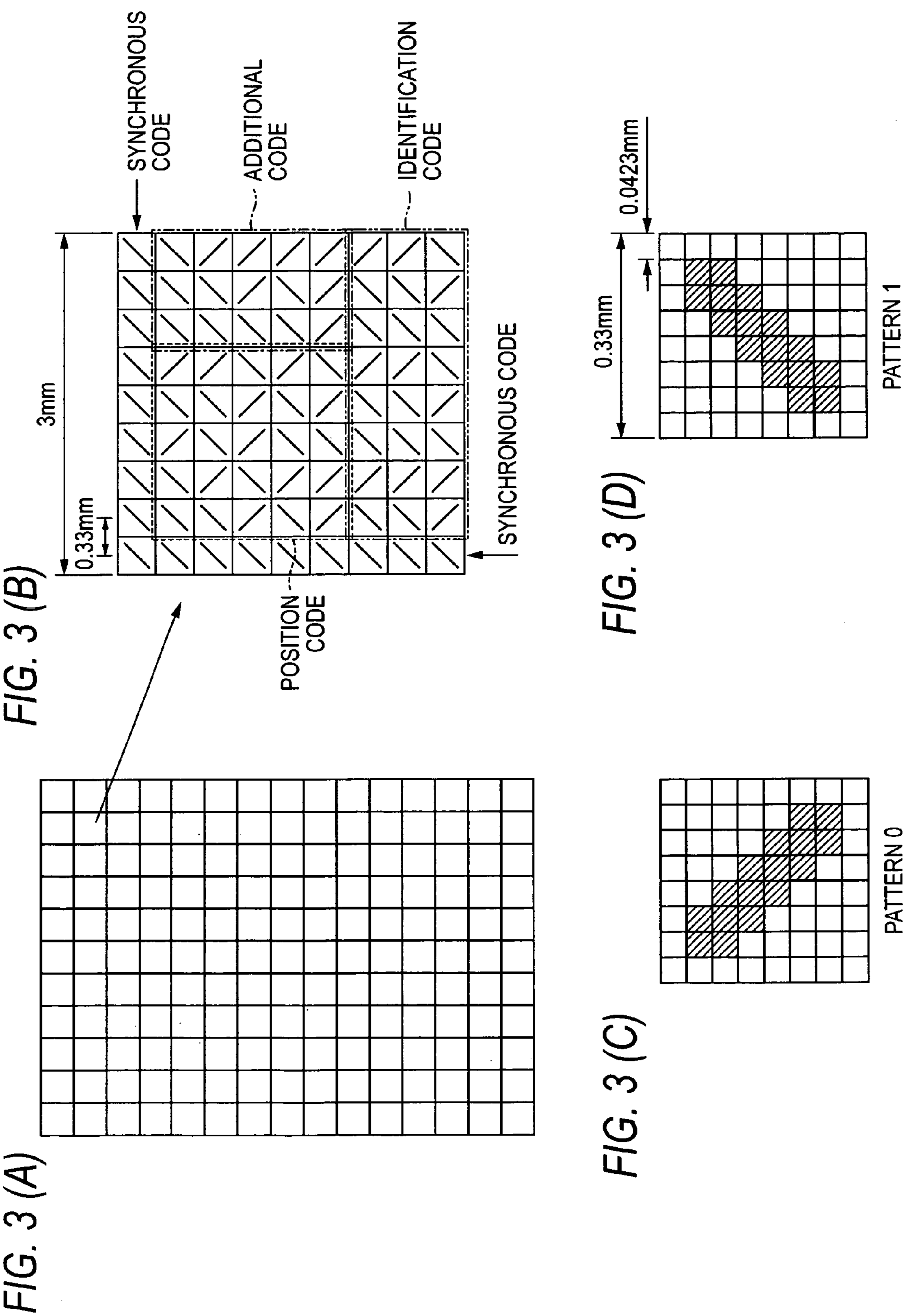
FIGS. 3(A) to (D) are drawings to describe a composition example of a two-dimensional code image used in the exemplary embodiment of the invention.

FIG. 3 (A) to FIG. 3 (D) are drawings to describe a composition example of a two-dimensional code image used in the exemplary embodiment. FIG. 3 (A) is a drawing represented like a lattice to schematically show the units of a two-dimensional code image formed of an invisible image and placed. FIG. 3 (B) is a drawing to show one unit of the two-dimensional code image whose invisible image is recognized by infrared light application. FIGS. 3 (C) and (D) is a drawing to describe slanting line patterns of a backslash "\" and a slash "/."

The two-dimensional code image formed in the image formation apparatus 400 is formed of invisible toner with the maximum absorption rate in a visible light region (400 nm to 700 nm) being 7% or less, for example, and the absorption rate in a near infrared region (800 nm to 1000 nm) being 30% or more, for example. The invisible toner with an average dispersion diameter ranging from 100 nm to 600 nm is adopted to enhance the near infrared light absorption capability required for mechanical read of an image.

The two-dimensional code image shown in FIG. 3 (A) to FIG. 3 (D) is formed as an invisible image for which mechanical read by infrared light application and decoding processing can be performed stably over a long term and information can be recorded at a high density. Preferably, the two-dimensional code image is an invisible image that can be provided in any desired area regardless of whether or not the area is an area where a visible image on the medium surface for outputting an image is provided. In the exemplary embodiment, the invisible image is formed on a full face of one side of a medium (paper face) matched with the size of a printed medium. However, the expression "full face" is not used to mean the full face containing all four corners of paper. With an apparatus such as an electrophotographic apparatus, usually the margins of the paper face are often in an unprintable range. Therefore, an invisible image is not printed in the range.

The two-dimensional code pattern shown in FIG. 3 (B) contains an area to store a position code indicating the coordinate position on the medium, an area to store an identification code for uniquely identifying the electronic document or the print medium, and an area to store an additional code used in a user application. It also contains an area to store a synchronous code. As shown in FIG. 3 (A), a plurality of the two-dimensional code patterns are placed and two-dimensional codes storing different pieces of position information are placed like a lattice on the full face of one side of the medium (paper face) matched with the size of the printed medium. That is, a plurality of two-dimensional code patterns as shown in FIG. 3 (B) are placed on one side of the medium, each including a position code, an additional code, an identification code, and a synchronous code. Different pieces of position information are stored in the areas of the position codes depending on the place where the position code is placed. On the other hand, the same identification information and the same additional information are stored in the identification code areas and the additional code areas independently of the place where the code is placed.

25-bit (=5 bits×5 bits) position information is stored in the position code area shown in FIG. 3 (B). When each slanting line pattern is formed of 8×8 pixels (600 dpi) as shown in FIGS. 3 (C) and (D), the size of the two-dimensional code (containing the synchronous code) in FIG. 3 (B) becomes about 3 mm in length and about 3 mm in width (8 pixels×9 bits×0.0423 mm) because one dot of 600 dpi is 0.0423 mm.

The identification code is placed in a 3-bit×8-bit rectangular area and 24-bit identification information can be stored.

The additional code is placed in a 5-bit×3-bit rectangular area and 15-bit additional information can be stored.

In the example shown in FIGS. 3 (C) and (D), the two slanting line patterns differ in angle 90 degrees, but if the angle difference is set to 45 degrees, four types of slanting line patterns can be formed. In doing so, one slanting line pattern can represent 2-bit information (any of 0 to 3). That is, as the number of angle types of slanting line patterns is increased, the number of bits that can be represented can be increased.

In the example shown in FIGS. 3 (C) and (D), coding of the bit values is described using the slanting line patterns, but the patterns that can be selected are not limited to the slanting line patterns. A coding method of dot ON/OFF or a coding method depending on the direction in which the dot position is shifted from the reference position can also be adopted.

The two-dimensional code image used in the exemplary embodiment has been described. The code pattern shown in FIGS. 3 (A) to (D) are only illustrative and various code patterns other than the code pattern can be used. For example, a black circle • rather than the slanting line pattern as shown in FIG. 3 (B), (C) and (D) may be drawn as a dot and information (0, 1) may be represented according to the size of the black circle. A virtual raster pattern shaped like a lattice can be assumed, a dot such as a black circle • can be drawn at a position shifted a given distance with respect to the raster position, and information can be represented according to the shift direction of the dot relative to the raster position (for example, 0 to 3 (two bits) if the dot position is shifted up and down and from side to side).

Figure 4:
FIG. 4 is a drawing to show an example of a document printed by the image formation apparatus of the exemplary embodiment of the invention.

FIG. 4 is a drawing to show an example of a document printed by the described image formation apparatus 400.

In the example shown in the figure, a receipt is printed as a document. The amount of money (114000 yen) is already written on the receipt. Sealing appears in the lower right corner of the receipt. A code pattern is formed over the full face of the paper Next, the code image read device will be discussed.

Various types of a pen device, a scanner device, etc., are possible as the code image read device. For example, preferably a pen-type read device is used to recognize the move trace of the read device on a print medium from the code image read result and input a handwritten image. In the exemplary embodiment, however, to detect the presence or absence of tampering with a document, the code image on the print medium with the document printed thereon is read and therefore a scanner-type read device that can reliably read the whole surface of a print medium will be discussed.

Figure 5:
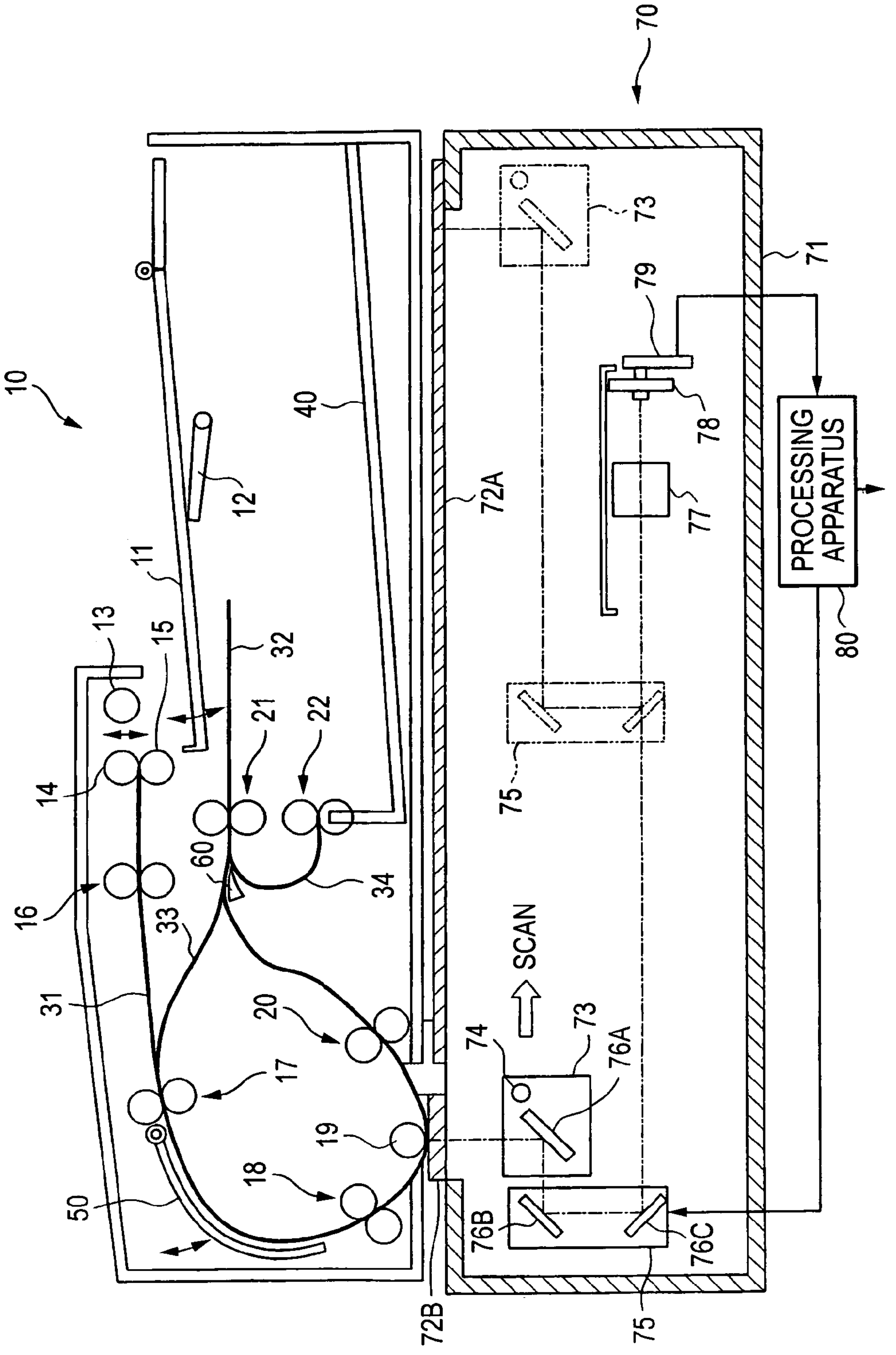
FIG. 5 is a drawing to show the configuration of a read device of the exemplary embodiment of the invention.

FIG. 5 is a drawing to show the configuration of the read device 600 of the exemplary embodiment.

The read device 600 is roughly made up of an original feeder 10 for transporting an original one at a time out of a stacked original bundle, a scanner 70 for reading an image by scanning, and a processor 80 for performing drive control of the original feeder 10 and the scanner 70 and processing an image signal read by the scanner 70.

The original feeder 10 includes an original tray 11 on which an original bundle made up of a plurality of originals can be stacked and a tray lifter 12 for moving up and down the original tray 11. The original feeder 10 also includes a naja roll 13 for transporting an original on the original tray 11 moved up by the tray lifter 12, a feed roll 14 for transporting furthermore downstream the original transported by the naja roll 13, and a retard roll 15 for handling the originals supplied by the naja roll 13 one at a time. A first transport passage 31 where an original is first transported involves a take away roll 16 for transporting the original handled to one at a time to a downstream roll, a preregistration roll 17 for transporting the original a furthermore downstream roll and forming a loop, a registration roll 18 for once stopping and then restarting rotation timely and supplying the original while performing registration adjustment to the original read section, a platen roll 19 for assisting transporting the original being read, and an out roll 20 for transporting the read original furthermore downstream. The first transport passage 31 is also provided with a baffle 50 for rotating on a supporting point in response to the loop state of the transported original.

Provided downstream from the out roll 20 is a second transport passage 32 placed below the original tray 11 for introducing the original into an ejection tray 40 for stacking the original whose read is complete. A first ejection roll 21 for ejecting the original to an ejection tray 40 is attached to the second transport passage 32. The first ejection roll 21 is rotated in normal and reverse directions to transport the original also in the opposite direction as described later.

The original feeder 10 is also provided with a third transport passage 33 for inverting and transporting the original whose read is complete so that images on both sides can be read in one process in reading an original formed with images on both sides. The third transport passage 33 is provided between the entry of the first ejection roll 21 and the entry of the preregistration roll 17. Further, the original feeder 10 is provided with a fourth transport passage 834 for once more inverting the original whose read is complete on both sides and then ejecting the original to the ejection tray 40 when both sides of the original are read. The fourth transport passage 34 is formed so as to branch downward from the entry of the first ejection roll 21, and a second ejection roll 22 for ejecting the original to the ejection tray 40 is attached to the fourth transport passage 34. At the branch part of the third transport passage 33 and the fourth transport passage 34, a transport passage switching gate 60 is provided for switching between the transport passages.

In the described configuration, the naja roll 13 is lifted up and is held at a retreat position in a standby mode and drops to a nip position (original transport position) at the original transport time for transporting the top original on the original tray 11. The naja roll 13 and the feed roll 814 transport the original by joining a feed clutch (not shown). The preregistration roll 17 abuts the leading end of the original against the registration roll 18 which stops, and forms a loop. At the registration roll 18, when the loop is formed, the leading end of the original nipped in the registration roll 18 is restored to the nip position. When the loop is formed, the baffle 50 opens with the supporting point as the center and functions so as not to hinder the original loop. The take away roll 16 and the preregistration roll 17 holds the loop during reading. As the loop is formed, the read timing can be adjusted and a skew accompanying the original transport at the read time can be suppressed for enhancing the adjustment function of registration. The registration roll 18 which stops starts to rotate at the read start timing and the original is pressed against second platen glass 72B (described later) by the platen roll 19 and the image data is read from the lower face (side) direction.

In the read device 600, in a single side mode for reading an image on one side of the original, the original whose read is complete on one side is introduced from the first transport passage 831 into the second transport passage 32 and is ejected to the ejection tray 40 by the first ejection roll 21.

On the other hand, in a double side mode for reading images on both sides of the original, the original whose read is complete on one side (first side) is introduced from the first transport passage 31 into the second transport passage 32 and is further transported by the first ejection roll 21. The transport passage switching gate 60 is switched so as to introduce the original into the third transport passage 33 at the timing just after the trailing end of the original in the transport direction passes through the transport passage switching gate 60, and the rotation direction of the first ejection roll 21 is switched to the opposite direction. Consequently, the original is introduced from the second transport passage 32 again into the first transport passage 31 with the original turned over. The original whose read is complete on the other side (second side) is introduced from the first transport passage 31 into the second transport passage 32 and is further transported by the first ejection roll 21. Then, the transport passage switching gate 60 is switched so as to introduce the original into the fourth transport passage 34 at the timing just after the trailing end of the original in the transport direction passes through the transport passage switching gate 60, and the rotation direction of the first ejection roll 21 is again switched to the opposite direction. Consequently, the original is introduced from the second transport passage 32 into the fourth transport passage 34 with the original further turned over, and is ejected to the ejection tray 40 by the second ejection roll 22.

As the configuration is adopted, in the original feeder 10 according to the exemplary embodiment, the original whose image read is complete can be stacked on the ejection tray 40 in a state in which the relation between the inside and the outside of the original is the same as that when the original is set on the original tray 11 regardless of the single side mode or the double side mode.

Next, the scanner 70 will be discussed.

The scanner 70 supports the above-described original feeder 10 on a frame 71 and reads the image of the original transported by the original feeder 10. The scanner 70 is provided with first platen glass 72A for placing the original whose image is to be read in a still state and the above-mentioned second platen glass 72B for forming a light opening to read the original being transported by the original feeder 10. In the exemplary embodiment, the original feeder 10 is attached to the scanner 70 so as to be swingable with the depth as a supporting point and to set the original on the first platen glass 72A, the user lifts up the original feeder 10 and places the original and then drops the original feeder 10 onto the scanner 70 to press the original.

The scanner 70 also includes a full rate carriage 73 being still below the second platen glass 72B and for scanning over the whole of the first platen glass 72A for reading the image and a half rate carriage 75 for giving light obtained from the full rate carriage 73 to an image coupling section. The full rate carriage 73 is provided with an illuminating lamp 74 for applying light to the original and a first mirror 76A for receiving reflected light obtained from the original. The illuminating lamp 74 applies light containing near infrared light for reading a code image.

The half rate carriage 75 is provided with a second mirror 76B and a third mirror 76C for giving light obtained from the first mirror 76A to an image formation section. Further, the scanner 70 includes an image forming lens 77 for optically reducing an optical image obtained from the third mirror 76C, a CCD (Charge-Coupled Device) image sensor 78 for executing photoelectric conversion of the optical image formed through the image forming lens 77, and a drive board 79 to which the CCD image sensor 78 is attached, and an image signal provided by the CCD image sensor 78 is sent through the drive board 79 to the processor 80. The CCD image sensor 78 has sensitivity also to near infrared light for reading a code image.

In the exemplary embodiment, the full rate carriage 73, the illuminating lamp 74, the half rate carriage 75, the first mirror 76A, the second mirror 76B, the third mirror 76C, the image forming lens 77, the CCD image sensor 78, and the drive board 79 make up read section. In the description of the exemplary embodiment, the CCD optical system as the optical system of the scanner 70 of the read device 600 is used by way of example, but a scanner using any other system, for example, an optical system of CIS, etc., may be used.

For original fix read of reading the image of an original placed on the first platen glass 72A, the full rate carriage 73 and the half rate carriage 75 move in the scan direction (arrow direction) at a ratio of 2 to 1. At this time, light of the illuminating lamp 74 of the full rate carriage 73 is applied to the read side of the original and the reflected light from the original is reflected on the first mirror 76A, the second mirror 76B, and the third mirror 76C in order and is introduced into the image forming lens 77. The light introduced into the image forming lens 77 is focused on the light reception face of the CCD image sensor 78. A line sensor provided in the CCD image sensor 78 is a one-dimensional sensor for processing one line at a time. When read of one line in the line direction (main scanning direction) is complete, the full rate carriage 73 is moved in the direction orthogonal to the main scanning direction (subscanning direction) and the next line of the original is read. This sequence is executed over the whole original size, whereby the one-page original read is completed.

On the other hand, the second platen glass 72B is formed of a transparent glass plate having a long plate-like structure, for example. For original flow read of reading the image of an original transported by the original feeder 10, the original transported by the original feeder 10 passes through on the top of the second platen glass 72B. At this time, the full rate carriage 73 and the half rate carriage 75 are in a state in which they stop at the positions indicated by the solid lines in FIG. 5. First, reflected light on the first line of the original passing through the platen roll 19 of the original feeder 10 passes through the first mirror 76A, the second mirror 76B, and the third mirror 76C and is focused in the image forming lens 77 and the image is read by the CCD image sensor 78. That is, the line sensor of the one-dimensional sensor provided in the CCD image sensor 78 processes one line in the main scanning direction at a time and then reads the next one line in the main scanning direction of the original transported by the original feeder 10. After the leading end of the original arrives at the read position of the second platen glass 72B, the original passes through the read position of the second platen glass 72B, whereby the one-page read over the subscanning direction is completed.

Next, a processing apparatus 80 will be discussed.

Figure 6:
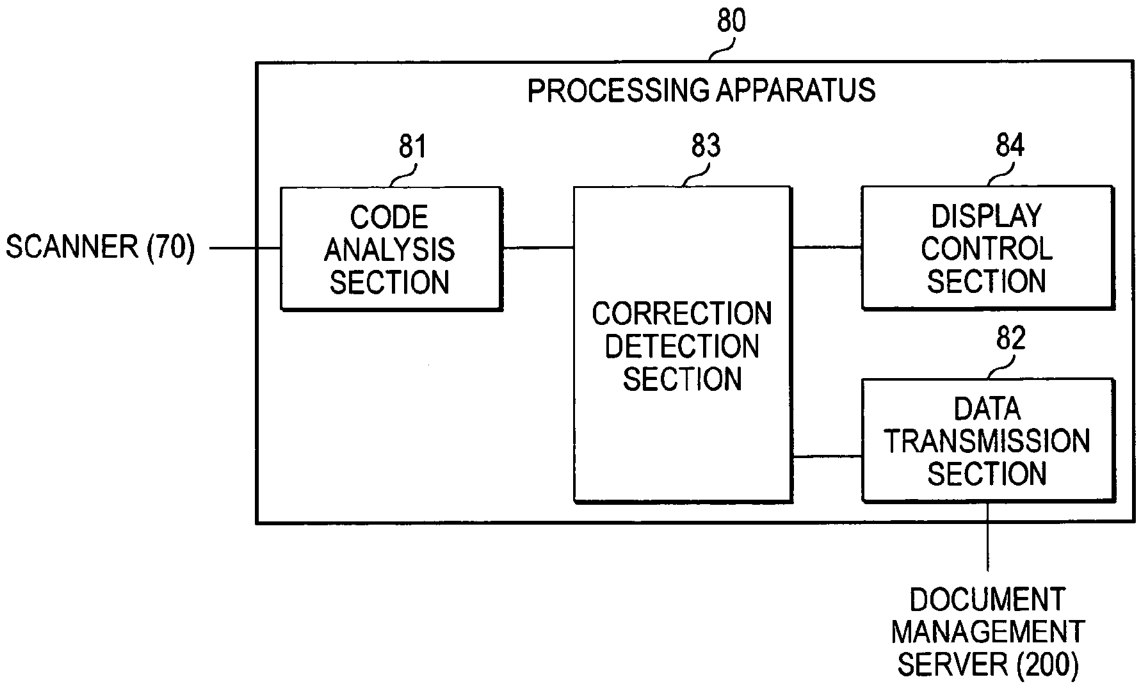
FIG. 6 is a drawing to show the functional configuration of a processing apparatus in the read device in FIG. 5.

FIG. 6 is a drawing to show the functional configuration of the processing apparatus 80.

Referring to FIG. 6, the processing apparatus 80 includes a code analysis section 81, a data transmission section 82, a correction detection section 83, and a display control section 84. The processing apparatus 80 is implemented as a processor and storage (semiconductor memory, magnetic disk unit, etc.,). The processor operates in accordance with a program stored in the storage and implements the functions shown in FIG. 6.

The code analysis section 81 analyzes the image data read through the scanner 70 and acquires code information described according to a code pattern. Since the code image is formed using a color material having a high absorption ratio of infrared light of a specific wavelength as described above, the image based on the infrared light is separated from the read image data, whereby the code image formed on the print medium can be extracted.

The data transmission section 82 transmits the image data read through the scanner 70 and the information provided by analyzing the image data to the document management server 200 through the network 900 shown in FIG. 1. The document management server 200 receives, registers, and manages the information.

The correction detection section 83 analyzes the code information provided by the code analysis section 81 performing the processing and checks the presence or absence of a missing portion of the code pattern in the code image formed on the print medium. If a missing portion of the code pattern is detected, it is determined that a correction has been made to the document image on the medium. The transmission processing of the data transmission section 82 is canceled and the electronic data of the document whose image is read is not registered in the document management server 200.

Since the code pattern is placed regularly on the print medium, as the code information provided by the code analysis section 81 is checked in sequence, the missing place of the code pattern can be located. If position information (address) on the print medium is described as the code information, a search is made for a lack of the position information, whereby the missing place of the code pattern can be located.

If a description on the print medium is erased with white-out, etc., the portion where the white-out is deposited or another piece of paper or the like is put does not allow an infrared ray to pass through and thus it becomes impossible to read a code image. Therefore, it can be determined that the missing portion of the code pattern detected by the correction detection section 83 is an erasion portion with white-out, etc., (tampering portion).

If a handwritten image (text or a graphic form) is written onto a print medium or small dirt or dust is deposited on a print medium, no code image may be read; however, usually the missing portion of the code pattern caused by a handwritten image or deposition of small dirt or dust is only in a minute range. Therefore, if the area of the missing portion of the code pattern is equal to or larger than a given threshold value, the portion is determined a correction portion with white-out, etc.

The following processing is also possible: Lack information and information other than code information such as text are checked and only if a portion other than code information such as text is missing, it is determined that a correction with white-out, etc., has been made.

Further, the correction detection section 83 can make a comparison between the code information generated to form a code image and the code information provided by processing the code image extracted from the read image and determine the presence or absence of a correction instead of determining whether or not a correction has been made to the document image on the print medium based on the presence or absence of a missing portion of the code pattern. Specifically, when a code image is printed on a print medium, information of the print date and time, the medium ID for identifying the medium, the document ID for identifying the printed electronic document, the apparatus ID of the printer, etc., is contained as the information described according to the code image. The information is managed in the document management server 200, etc. The correction detection section 83 makes a comparison between the code information provided by decoding the code image extracted by the code analysis section 81 and the code information generated at the stored code image printing time. If they do not completely match, there is a possibility that some correction may be made to the code image and therefore it is determined that a correction has been made to the document image on the medium as with the case where a missing portion of the code pattern is detected as described above.

If the correction detection section 83 determines that there is a correction portion with white-out, etc., on the print medium, the display control section 84 functions as request section that requests the user to determine whether the correction portion (missing portion of code pattern) is a tampering portion or is authorized. That is, the display control section 84 displays the image read from the print medium on a predetermined display in such a manner that the user can visually recognize the missing portion of the code pattern. A handwritten image portion or a dirt or dust deposition portion can be distinguished from the correction with white-out, etc., by evaluating the area of the missing portion of the code pattern as described above. However, if a seal, etc., is put on the print medium, code image read is made impossible in a considerably large area and therefore the sealing cannot be distinguished from the correction with white-out, etc. Then, in such a case, the area in which the code image cannot be read is explicitly displayed on the display, requesting the user to determine whether or not the missing portion of the code pattern is authorized because of sealing, etc.

Figure 7:
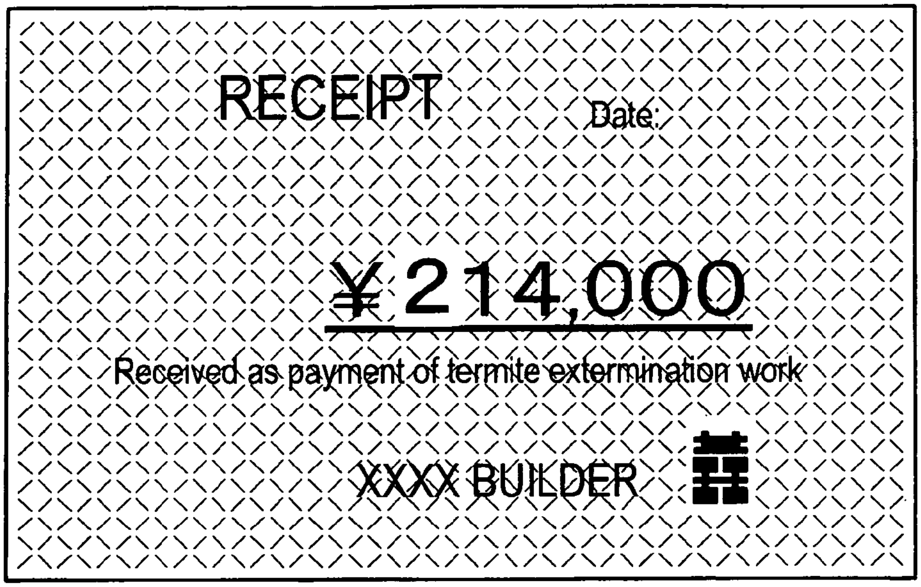
FIG. 7(A) and (B) drawings to show a state in which a correction with white-out, etc., has been made to the document shown in FIG. 4.
Figure 7:
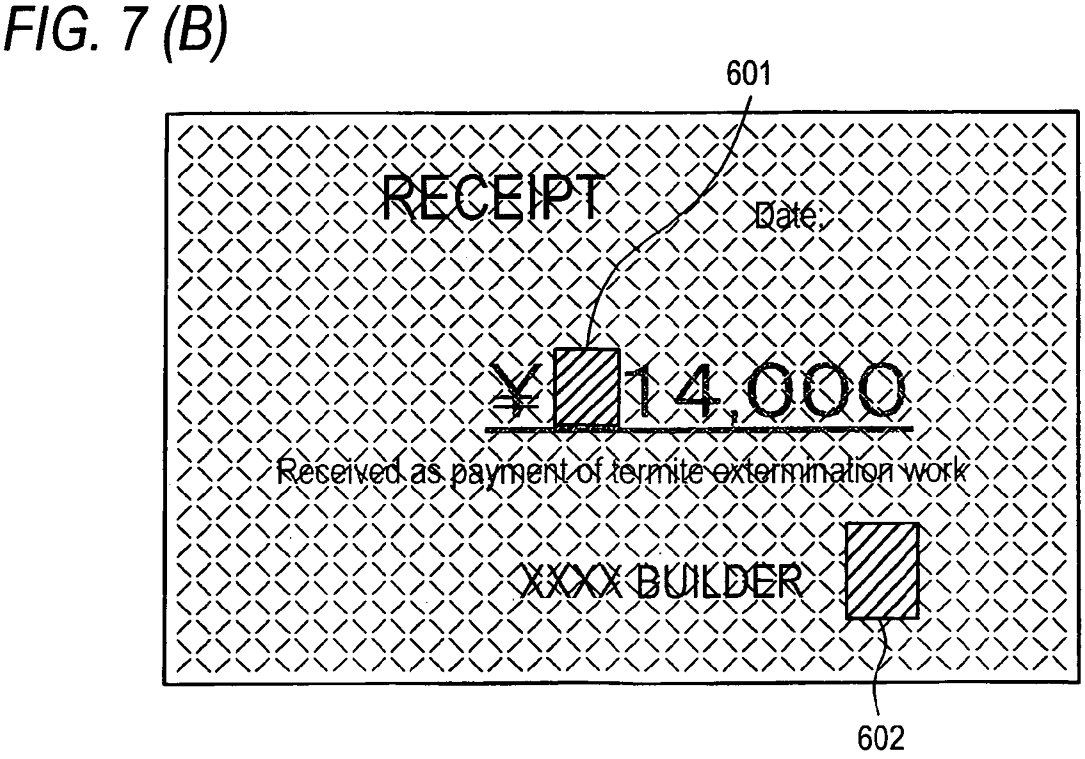

FIGS. 7 (A) and (B) are drawings to show a state in which a correction with white-out, etc., has been made to the document (receipt) shown in FIG. 4.

FIG. 7 (A) shows a document tampered with. Making a comparison between the document FIG. 4 and the document in FIG. 7 (A), the value "1" in the highest place of the amount of money is erased with white-out and the value "2" is written into the highest place.

FIG. 7 (B) shows an image of the document in FIG. 7 (A) read with the read device 600 and displayed on the display under the control of the display control section 84 of the processing apparatus 80. In FIG. 7 (B), the missing portion of the code pattern having a given area except for characters is hatched. As shown in the figure, in addition to a digit tampering portion 601, a sealing portion 602 in the lower right portion of the receipt also becomes a missing portion of the code pattern having a considerable width. Therefore, the user sees the display and determines whether the missing portion of the code pattern results from tampering with the document or is authorized because of sealing, etc. The user operates a console panel provided on the read device 600 to specify whether or not to register the image data. Accordingly, if the document is tampered with, registration of the image data is canceled; if the document is not tampered with, the image data is registered.

As described above, according to the exemplary embodiment, a code image is previously printed on paper of a document to be electronized, whereby if the document is tampered with, when the image data is read, the tampering can be detected based on the presence or absence of a lack of the code pattern formed on the paper. If the tampering with the document is detected, registration of the document in the document management server 200 is canceled. Accordingly, it is made possible to prevent a document from being tampered with before the document is electronized.

In the exemplary embodiment, the read device 600 is provided with the function of detecting a correction to a document from lack of a code pattern, but any other component in FIG. 1, for example, the document management server 200 for managing the image data read with the read device 600 as an electronic document can also be provided with the function.

SECOND EXEMPLARY EMBODIMENT

In a second exemplary embodiment of the invention, a system for detecting previous tampering with a document created with another piece of paper such as a voucher (simply, voucher) put thereon when the image of the document is first read will be discussed as the technique of detecting tampering at a stage before a document is electronized. To detect tampering with a document, the exemplary embodiment uses a technique of forming a code image of a dot pattern on a print medium (paper) on which the document is to be created and describing predetermined formation according to the dot pattern.

In the exemplary embodiment, when the image of the document created with a voucher put on paper (application, etc.,) is first read, a code image is printed on the document together with the voucher put on paper. Accordingly, after the image of the document is read, if the voucher is removed from the paper and is put on another sheet of paper to create a new document, the code image is already printed on the put voucher, so that it is made possible to detect tampering with the document by recognizing the code image.

In the exemplary embodiment, code image printing, reading, and management are conducted in a system as shown in FIG. 1 as in the first exemplary embodiment. The composition of the code pattern and the composition of toner for forming the code image are also similar to those in the first exemplary embodiment described above.

Next, a read device will be discussed.

Figure 8:
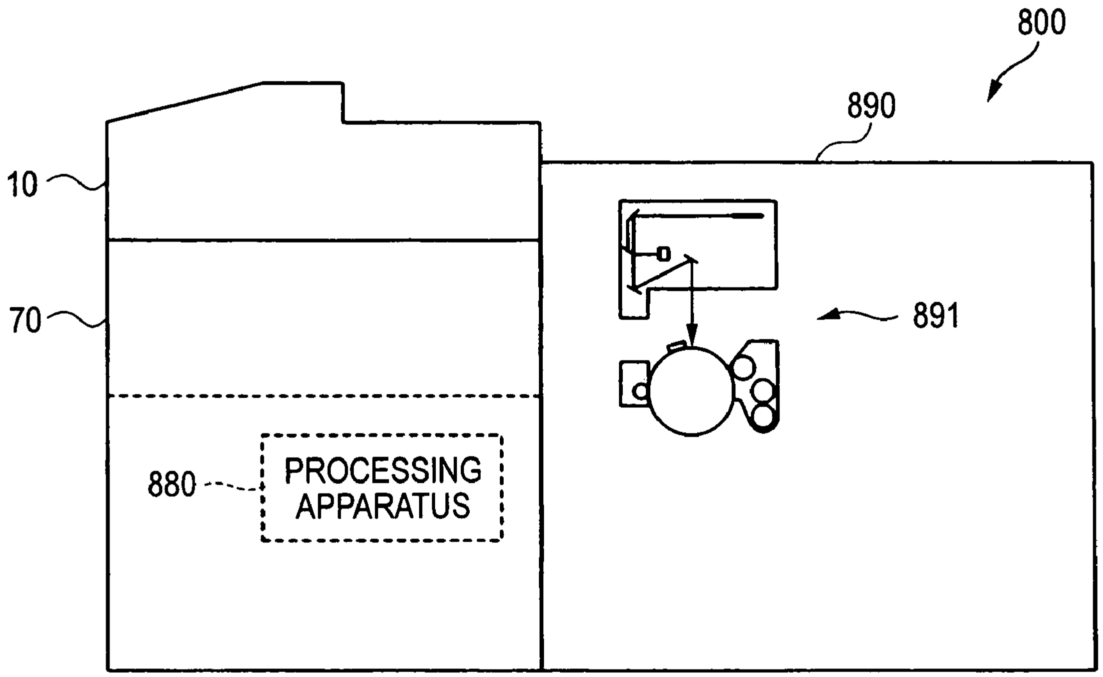
FIG. 8 is a drawing to show the configuration of a read device of a second exemplary embodiment of the invention.

FIG. 8 is a drawing to show the configuration of a read device 800 of the exemplary embodiment.

In the exemplary embodiment, when the image of a document is read, a code image is printed on the document paper, as described above. Therefore, the read device 800 of the exemplary embodiment is provided with a code image formation apparatus 890 for forming a code image on paper.

In FIG. 8, an original feeder 10 and a scanner 70 are similar to the original feeder 10 and the scanner 70 in the read device 600 of the first exemplary embodiment shown in FIG. 5 and therefore are denoted by the same reference numerals as those in FIG. 5 and will not be discussed again.

Figure 9:
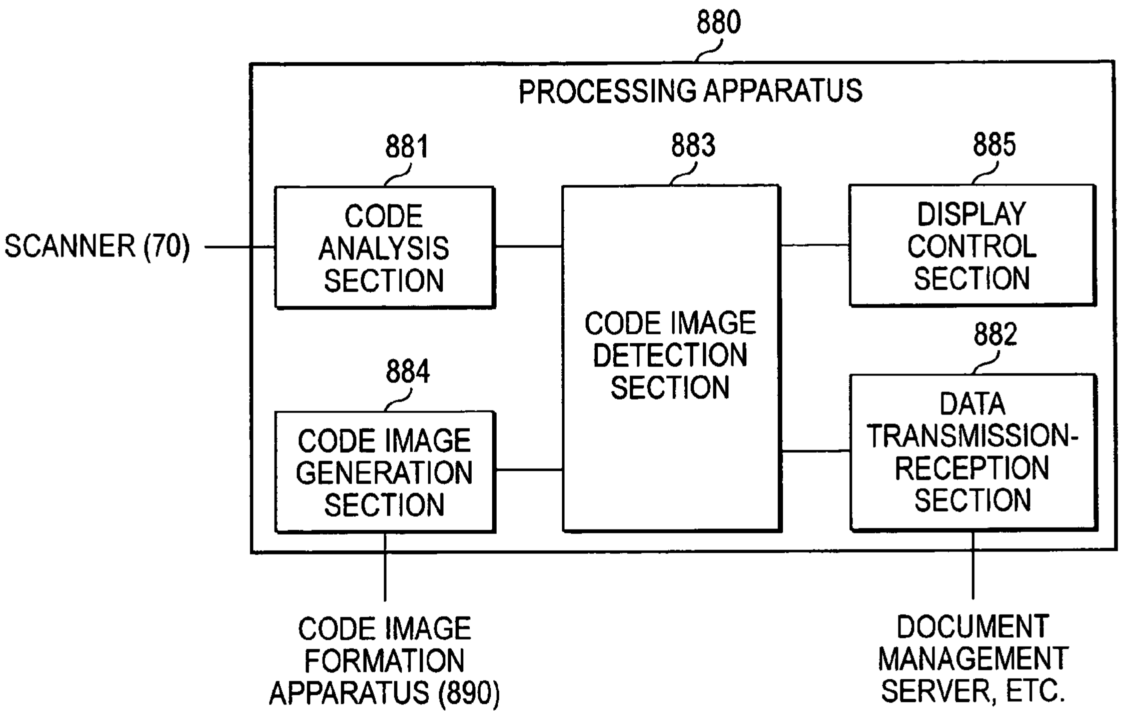
FIG. 9 is a drawing to show the functional configuration of a processing apparatus in the read device in FIG. 8.

FIG. 9 is a drawing to show the functional configuration of a processing apparatus 880.

Referring to FIG. 9, the processing apparatus 880 includes a code analysis section 881, a data transmission-reception section 882, a code image detection section 883, a code image generation section 884, and a display control section 885. The processing apparatus 880 is implemented as a processor and storage (semiconductor memory, magnetic disk unit, etc.,). The processor operates in accordance with a program stored in the storage and implements the functions shown in FIG. 9.

The code analysis section 881 analyzes the image data read through the scanner 70 and acquires code information described according to a code pattern. Since the code image is formed using a color material having a high absorption ratio of infrared light of a specific wavelength as described above, the image based on the infrared light is separated from the read image data, whereby the code image formed on the print medium can be extracted.

The data transmission-reception section 882 transmits the image data read through the scanner 70 and the information provided by analyzing the image data to a document management server 200 through the network 900 shown in FIG. 1. The document management server 200 receives, registers, and manages the information. The data transmission-reception section 882 accesses the document management server 200, etc., and acquires information necessary for the code image detection section 883 (described later) to make a determination and information described in a code image generated by the code image generation section 884.

The code image detection section 883 detects whether or not a code image is printed on the voucher put on the document based on the analysis result of the code analysis section 881. From the fact that a code image is printed on the voucher, it is considered that the possibility that the voucher may be already put on a different document and be electronized is high. Then, in such a case, the transmission processing of the data transmission-reception section 882 is canceled and the electronic data of the document whose image is read is not registered in the document management server 200. If previous registration of a document registered in the document management server 200 is canceled and again registration is filed, a code image is printed on the voucher put on the document. In this case, the document management server 200 is inquired and again registration can be conducted provided that it is confirmed that the registration of the electronic document is withdrawn. In this case, the information of the electronic document registered in the document management server 200 is inherited as it is, and the code image formation apparatus 890 is controlled so as not to again print a code image on the voucher.

If information of the identification information of the registered electronic document, the registration date and time of the electronic document, the identification information of the read device 800, the registration order, etc., is described according to the code pattern forming the code image printed on the voucher, the information can also be decoded and acquired from the code image for inquiring of the document management server 200.

If the position where the code information is to be detected on a document is limited as the position where a voucher is put is limited, etc., the presence or absence of code information may be determined only from the area where the voucher is put rather than the whole document.

If the code image detection section 883 determines that a code image is not printed on the voucher, the code image generation section 884 generates a code image to be printed on the voucher. The code pattern forming the code image can contain information of the identification information of the electronic document, the document image read date and time, the identification information of the read device 800, the registration order in the document management server 200, etc., managed in identification information management server 300.

If the code image detection section 883 determines that a code image is already printed on the voucher put on the document, the display control section 885 displays a message to the effect that a code image is already printed on the voucher on a predetermined display for the user.

The code image formation apparatus 890 is provided with an image formation unit 891 for forming a code image as shown in FIG. 8 and the image formation unit 891 receives paper ejected from the original feeder 10 and forms the code image generated by the code image generation section 884 of the processing apparatus 880 on the paper. The configuration of the image formation unit 891 is similar to that of the image formation unit 41 of the image formation apparatus 400 previously described with reference to FIG. 2 in the first exemplary embodiment. The image formation unit 891 stores invisible toner for forming a code image and prints a code image on paper using the invisible toner as a color material.

As described above, according to the exemplary embodiment, when the document created with a voucher put thereon is electronized, a code image is printed on the document together with the voucher put on paper, whereby if an attempt is later made to put the voucher on another document and again electronize the document, it can be determined that the voucher is contained in the already electronized document by reading the code image printed on the voucher. Accordingly, it is made possible to prevent tampering of removing a voucher on one document and putting the voucher on another document to create a new document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document correction detection system comprising:

a code analysis section that inputs a read image provided by optically reading a print medium on which a document image and a code image are formed, where the document image is superimposed on the code image, and a two-dimensional code pattern forms the code image;

the code analysis section extracts the code image from the read image; and a correction detection section that determines a correction made in two dimensions to the document image on the print medium if an anomaly in the two-dimensional code pattern of the code image itself extracted by the code analysis section is detected, wherein the two-dimensional code pattern contains a first area that stores a position code indicating a coordinate position on the print medium, a second area that stores an identification code for uniquely identifying the print medium, and a third area that stores an additional code used in a user application.

2. The document correction detection system as claimed in claim 1 further comprising:

a display control section that displays the read image on a display if the correction detection section detects an anomaly in the code image itself.

3. The document correction detection system as claimed in claim 1, wherein if a missing portion of the code pattern forming the code image extracted by the code analysis section is detected, the correction detection section determines that a correction is made to the document image on the print medium.

4. The document correction detection system as claimed in claim 3, wherein if the area of the detected missing portion of the code pattern is equal to or larger than a given area, the correction detection section determines that a correction is made to the document image on the print medium.

5. The document detection system as claimed in claim 1, wherein if a comparison is made between code information generated to form the code image and code information provided by processing the code image extracted from the read image and they differ in description, the correction detection section determines that a correction is made to the document image on the print medium.

6. The document correction detection system as claimed in claim 1, wherein the document image and the code image are formed on a single layer.

7. The document correction detection system as claimed in claim 1 further comprising:

a display control section that displays the read image on a display if the correction detection section detects an anomaly in the code image itself, wherein the document image and the code image are formed on a single layer, the code image is a color material having a high absorption ratio of infrared light of a specific wavelength, the document image has an extremely low absorption ratio of infrared light, and if the area of a missing portion of the two-dimensional code pattern forming the code image extracted by the code analysis section is equal to or larger than a given area, or if a comparison is made between code information generated to form the code image and code information provided by processing the code image extracted from the read image and they differ in description, the correction detection section determines that a correction is made to the document image on the print medium.

8. The document correction detection system as claimed in claim 7, wherein the code image includes a plurality of separate two-dimensional code patterns.

9. A document tampering prevention system comprising:

a read section that optically reads a print medium on which a document image and a code image are formed, where the document image is superimposed on the code image and a two-dimensional code pattern forms the code image;

a detection section that extracts the code image from the read image read by the read section and checks the presence or absence of an anomaly in the two-dimensional code pattern of the code image itself; and a management section that manages the read image read by the read section serving as electronic data of the document, wherein the two-dimensional code pattern contains a first area that stores a position code indicating a coordinate position on the print medium, a second area that stores an identification code for uniquely identifying the print medium, and a third area that stores an additional code used in a user application, and wherein if the detection section detects an anomaly of the two-dimensional code pattern in the code image itself in a predetermined document, the management section excludes the read image of the predetermined document from management objects.

10. The document tampering prevention system as claimed in claim 9, wherein if the detection section detects a missing portion of the code pattern forming the code image as for the predetermined document, the management section excludes the read image of the predetermined document from management objects.

11. The document tampering prevention system as claimed in claim 9, wherein the detection section has a comparison section that subjects a comparison between code information generated to form the code image and code information provided by processing the code image extracted from the read image, and wherein if the comparison section determines that the former code information and the latter code information differ in the predetermined document, the management section excludes the read image of the predetermined document from management objects.

12. The document tampering prevention system as claimed in claim 9, wherein the document image and the code image are formed on a single layer.

13. The document tampering prevention system as claimed in claim 9, wherein the anomaly is two-dimensional.

14. A document tampering prevention system comprising:

a read section that optically reads a print medium on which a document image is formed;

an image formation section that prints a code image describing code information, on the print medium read by the read section, indicating that the read section has already read the print medium using a color material much absorbing light of a specific wavelength, and a two-dimensional code pattern forms the code image;

a code image detection section that checks whether or not the code image is contained in the read image of the document read by the read section;

a correction detection section that extracts the code image from the read image read by the read section and checks the presence or absence of an anomaly in the two-dimensional code pattern of the code image itself; and a management section that manages the read image read by the read section, wherein the two-dimensional code pattern contains a first area that stores a position code indicating a coordinate position on the print medium, a second area that stores an identification code for uniquely identifying the print medium, and a third area that stores an additional code used in a user application, and wherein if the code image is extracted from the read image read by the read section in a predetermined document, the management section excludes the read image of the predetermined document from management objects.

15. The document tampering prevention system as claimed in claim 14, wherein the light of a specific wavelength is light having a wavelength of infrared region.

16. The document tampering prevention system as claimed in claim 14, wherein the image formation section prints the code image at least at a specific position of the print medium, and wherein the code image detection section checks whether or not the code image is printed at the specific position of the read image read by the read section.

17. The document tampering prevention system as claimed in claim 16, wherein the specific position of the print medium is a fixed put position where a voucher is put on the print medium.

18. The document tampering prevention system as claimed in claim 14, wherein the image formation section prints a code image describing information representing the uniqueness of the document as the code information on the print medium, and wherein the code image detection section acquires the code information from the detected code image and compares the code information with the information of the read image managed in the management section.

19. The document tampering prevention system as claimed in claim 14, wherein the read section reads the print medium according to light containing the specific wavelength, and wherein the code image detection section extracts the image data read according to the light of the specific wavelength as the code image from the read image read by the read section.

20. The document tampering prevention system as claimed in claim 14, wherein the anomaly is two-dimensional.

21. A document tampering prevention system comprising:

a read section that optically reads a print medium on which a document image is formed to obtain a read image;

a code image detection section that checks whether or not a code image is contained in the read image, and a two-dimensional code pattern forms the code image;

a correction detection section that extracts the code image from the read image read by the read section and checks the presence or absence of an anomaly in the two-dimensional code pattern of the code image itself;

an image formation section that, when the code image detection section determines that the code image is not contained in the read image, prints a code image describing code information on the print medium indicating that the read section has already read the print medium using a color material that mostly absorbs light of a specific wavelength;

a management section that manages the read image of the print medium obtained by the read section, wherein the two-dimensional code pattern contains a first area that stores a position code indicating a coordinate position on the print medium, a second area that stores an identification code for uniquely identifying the print medium, and a third area that stores an additional code used in a user application, and wherein if the code image is extracted from the read image, the management section excludes the read image from management objects.

22. The document tampering prevention system as claimed in claim 21, wherein the anomaly is two-dimensional.

23. A document correction detection system comprising:

a code analysis section that inputs a read image provided by optically reading a print medium on which a document image and a code image are formed, where the document image is superimposed on the code image, and a two-dimensional code pattern forms the code image;

the code analysis section extracts the code image from the read image; and a correction detection section that determines a correction made to the document image on the print medium if an anomaly in the two-dimensional code pattern of the code image itself extracted by the code analysis section is detected, wherein the two-dimensional code pattern contains a first area that stores a position code indicating a coordinate position on the print medium, a second area that stores an identification code for uniquely identifying the print medium, and a third area that stores an additional code used in a user application.

* * * * *